United States Patent
Nakamura et al.

(10) Patent No.: US 8,589,039 B2
(45) Date of Patent: Nov. 19, 2013

(54) CONTROL DEVICE FOR AUTOMATIC TRANSMISSION AND CONTROL METHOD THEREFOR

(75) Inventors: Arata Nakamura, Ebina (JP); Masaki Watanabe, Machida (JP); Kazuya Murota, Tokyo (JP); Daisuke Kozuma, Machida (JP); Toshinori Sasaki, Atsugi (JP)

(73) Assignee: Jatco Ltd, Fuji-shi (JP)

( * ) Notice: Subject to any disclaimer, the term of this patent is extended or adjusted under 35 U.S.C. 154(b) by 0 days.

(21) Appl. No.: 13/494,367

(22) Filed: Jun. 12, 2012

(65) Prior Publication Data

US 2012/0323457 A1 Dec. 20, 2012

(30) Foreign Application Priority Data

Jun. 20, 2011 (JP) ................................. 2011-135920

(51) Int. Cl.
*G06F 17/00* (2006.01)
*H02P 17/00* (2006.01)

(52) U.S. Cl.
USPC ............................................. 701/51; 477/15

(58) Field of Classification Search
USPC ................. 701/51–56, 62, 64, 87, 93, 95,
701/103–105, 112; 180/170, 336;
280/12.12, 12.14, 237; 474/111, 169,
474/473.1, 567, 117, 821; 477/15, 50,
477/69, 76, 98, 117, 37, 97, 91; 123/288,
123/258, 292, 321, 90.23, 90.4, 146, 336,
123/348, 47 AB, 65 V, 41.05, 339.22,
123/339.24, 381, 406.55, 406.7, 435, 678,
123/686, 689, 558, 421, 425; 73/593, 660,
73/820, 114.63, 114.41–114.57, 204.19;
74/473.1, 567, 117, 821
See application file for complete search history.

(56) References Cited

U.S. PATENT DOCUMENTS

| | | | |
|---|---|---|---|
| 4,519,790 A | 5/1985 | Yamamuro et al. | |
| 4,736,301 A | 4/1988 | Osanai | |
| 5,261,295 A | 11/1993 | Iwanaga et al. | |
| 6,168,547 B1 | 1/2001 | Kawamura | |
| 7,112,154 B2 | 9/2006 | Wakahara et al. | |
| 2004/0162183 A1* | 8/2004 | Wakahara et al. | 477/18 |

FOREIGN PATENT DOCUMENTS

| | | |
|---|---|---|
| JP | 2002-340160 A | 11/2002 |
| JP | 2004-183746 A | 7/2004 |

OTHER PUBLICATIONS

T. Iinami, U.S. PTO Office Action, U.S. Appl. No. 13/019,697, dated Feb. 13, 2013, 12 pages.
T. Hinami, U.S. PTO Office Action, U.S. Appl. No. 13/019,697, dated Jul. 29, 2013, 12 pages.

\* cited by examiner

*Primary Examiner* — James Trammell
*Assistant Examiner* — Muhammad Shafi
(74) *Attorney, Agent, or Firm* — Foley & Lardner LLP (57) ABSTRACT

A control device for automatic transmission includes a flow control mechanism for introducing a part of hydraulic oil discharged from a mechanical oil pump into the mechanical oil pump when a differential pressure between an upstream side and a downstream side of a narrow part provided in a discharge passage in which hydraulic oil discharged from the mechanical oil pump flows becomes larger than a predetermined value. Air mixed into the hydraulic oil is compressed by increasing a line pressure as a differential rotation speed increases when oil temperature of the hydraulic oil is equal to or higher than a predetermined oil temperature and an engine torque is equal to or lower than a predetermined engine torque.

9 Claims, 8 Drawing Sheets

CONTROL DEVICE FOR AUTOMATIC TRANSMISSION AND CONTROL METHOD THEREFOR

FIELD OF THE INVENTION

The present invention relates to a control device for automatic transmission and control method thereof.

BACKGROUND OF THE INVENTION

It is disclosed in JP2004-183746A that a flow control valve is provided in a discharge-side flow path of an oil pump.

In JP2004-183746A, a spool which functions as a flow control valve includes an orifice and the spool moves according to a differential pressure between an upstream side and a downstream side of the orifice. The spool adjusts the opening area of a drain hole which is formed in a side surface of the spool and communicates with a suction passage of an oil pump. Nominally, the spool is biased to close the drain hole by a spring or the like. The spool moves to open the drain hole if the differential pressure between the pressure at the upstream side of the orifice and that at the downstream side of the orifice becomes larger than a biasing force of the spring.

By returning hydraulic oil discharged from the oil pump to the suction passage of the oil pump using such a flow control valve, the suction amount of the hydraulic oil mixed with air having a low compression ratio decreases and discharge efficiency of the oil pump is improved.

However, if more air is mixed into the hydraulic oil sucked into the oil pump from an oil pan, the discharge amount of the oil pump pulsates and the differential pressure also pulsates. As a result, even if the drain hole has to be essentially in a communicating state, the spool may move to close the drain hole by the biasing force of the spring, thereby bringing the drain hole into a non-communicating state, when the differential pressure becomes smaller due to pulsation.

In such a case, the hydraulic oil mixed with air having a low compression ratio is sucked into the oil pump and the volume of air in oil in the oil pump increases. Thus, the discharge amount of the oil pump further decreases and a necessary hydraulic pressure cannot be supplied, for example, in a transmission or the like.

Contrary to this, it is disclosed in JP2002-340160A that the amount of air mixed into hydraulic oil is calculated and the rotation speed of an electrical oil pump is increased in consideration of a reduction in discharge amount caused by air mixture.

SUMMARY OF THE INVENTION

Since the electrical oil pump is driven by a motor, the rotation speed of the electrical oil pump can be freely controlled. However, in a mechanical oil pump which is driven by rotation produced by an engine or the like, there are problems of difficulty in individually controlling the rotation speed of the mechanical oil pump and preventing a reduction of the above discharge amount.

The present invention was developed to solve such problems and aims to suppress a reduction in the discharge amount of a mechanical oil pump caused by air mixture into hydraulic oil.

One aspect of the present invention is directed to a control device for automatic transmission for controlling an automatic transmission including a mechanical oil pump which is driven by having the rotation of an engine transmitted thereto; a suction passage in which hydraulic oil sucked into the mechanical oil pump flows; a discharge passage in which the hydraulic oil discharged from the mechanical oil pump flows and which includes a narrow part; a communicating passage which allows communication between the suction passage and a part of the discharge passage upstream of the narrow part in a flowing direction of the hydraulic oil while bypassing the mechanical oil pump; and a flow control mechanism which includes a spool for setting the communicating passage in a communicating state when a differential pressure between a hydraulic pressure upstream of the narrow part and that downstream of the narrow part in the flowing direction of the hydraulic oil is larger than a predetermined value and setting the communicating passage in a non-communicating state when the differential pressure is equal to or smaller than the predetermined value. The control device includes an oil temperature detection unit that detects oil temperature of the hydraulic oil; an engine torque calculation unit that calculates an engine torque; a line pressure setting unit that sets a higher line pressure as the engine torque increases; a first rotation speed detection unit that detects the rotation speed of an output shaft side of the automatic transmission; and a line pressure correction unit that increases the line pressure as the rotation speed of the output shaft side increases when the oil temperature is equal to or higher than a predetermined oil temperature at which the communicating passage is switched from the communicating state to the non-communicating state due to air mixed into the hydraulic oil and the engine torque is equal to or lower than a predetermined engine torque at which the communicating passage is switched from the communicating state to the non-communicating state due to air mixed into the hydraulic oil.

Another aspect of the present invention is directed to a control method for automatic transmission for controlling an automatic transmission including: a mechanical oil pump which is driven by having the rotation of an engine transmitted thereto; a suction passage in which hydraulic oil sucked into the mechanical oil pump flows; a discharge passage in which the hydraulic oil discharged from the mechanical oil pump flows and which includes a narrow part; a communicating passage which allows communication between the suction passage and a part of the discharge passage upstream of the throttle part in a flowing direction of the hydraulic oil while bypassing the mechanical oil pump; and a flow control mechanism which includes a spool for setting the communicating passage in a communicating state when a differential pressure between a hydraulic pressure upstream of the narrow part and that downstream of the narrow part in the flowing direction of the hydraulic oil is larger than a predetermined value and setting the communicating passage in a non-communicating state when the differential pressure is equal to or smaller than the predetermined value. The control method includes detecting oil temperature of the hydraulic oil; calculating an engine torque; setting a higher line pressure as the engine torque increases; detecting the rotation speed of an output shaft side of the automatic transmission; and increasing the line pressure as the rotation speed of the output shaft side increases when the oil temperature is equal to or higher than a predetermined oil temperature at which the communicating passage is switched from the communicating state to the non-communicating state due to air mixed into the hydraulic oil and the engine torque is equal to or lower than a predetermined engine torque at which the communicating passage is switched from the communicating state to the non-communicating state due to air mixed into the hydraulic oil.

According to these aspects, even if air is mixed into the hydraulic oil, the flow control mechanism can be caused to normally operate and a reduction in the discharge amount of the mechanical oil pump can be suppressed.

According to the present invention, even if air is mixed into the hydraulic oil, a reduction in the discharge amount of the mechanical oil pump can be suppressed.

DESCRIPTION OF THE PREFERRED EMBODIMENTS

Hereinafter, a first embodiment of the present invention is described with reference to the drawings.

Figure 1:
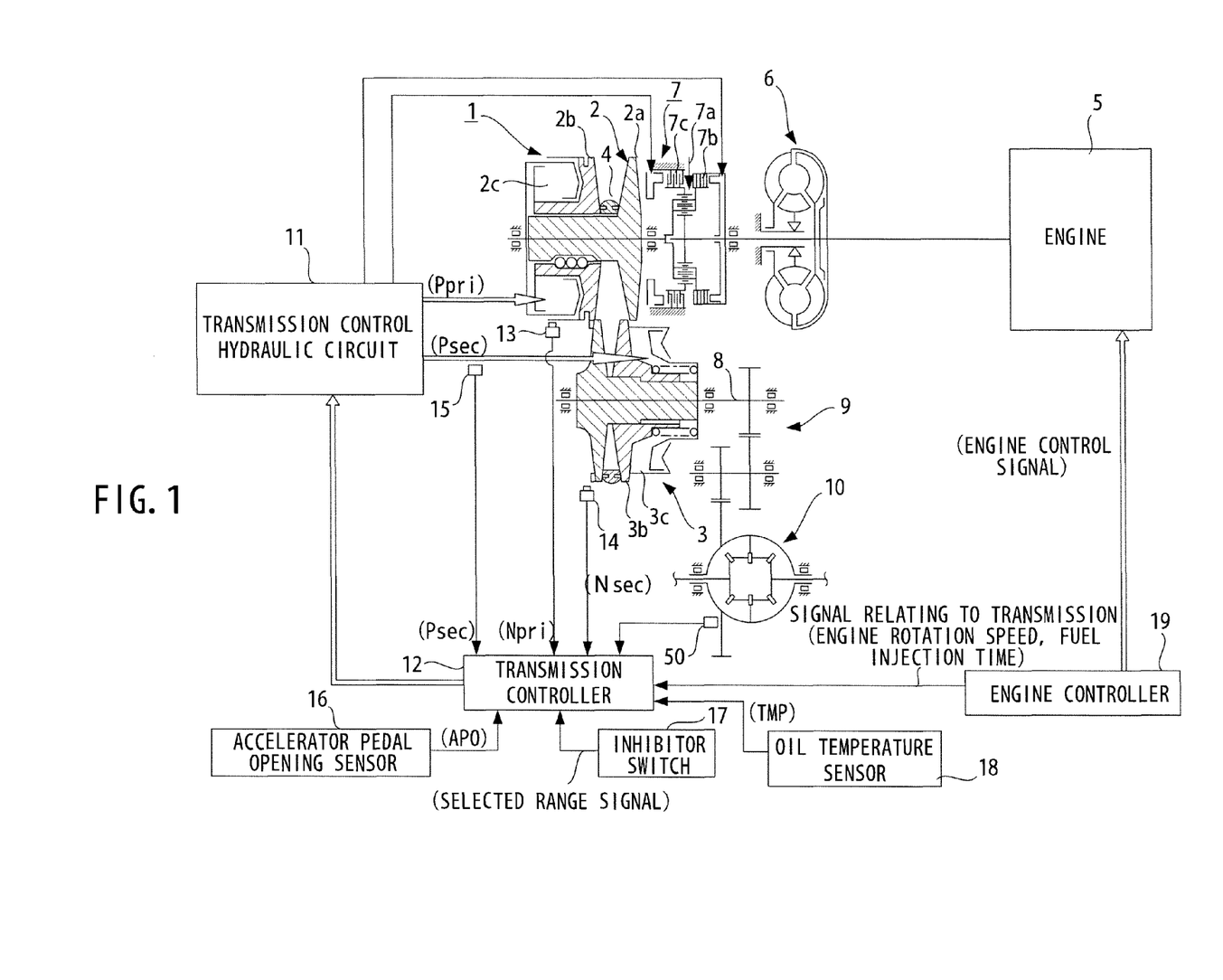
FIG. 1 is a schematic configuration diagram of a control device for automatic transmission of a first embodiment.

FIG. 1 shows an example of a control device for automatic transmission according to the first embodiment of the present invention. The automatic transmission is an automatic transmission in which an engine is transversely mounted, e.g. an FF automatic transmission. The shown automatic transmission is a V-belt continuously variable transmission 1. In this V-belt continuously variable transmission 1, a primary pulley 2 and a secondary pulley 3 are so arranged that V-grooves of both are aligned and a V-belt 4 is mounted in the V-grooves of these pulleys 2, 3. An engine 5 as a drive source is arranged coaxially with the primary pulley 2, and a torque converter 6 with a lock-up mechanism and a forward/reverse switching mechanism 7 are successively provided from the engine 5 side between the engine 5 and the primary pulley 2.

The forward/reverse switching mechanism 7 includes a double pinion planetary gear set 7a as a main element, a sun gear thereof is coupled to the engine 5 via the torque converter 6 and a carrier thereof is coupled to the primary pulley 2. The forward/reverse switching mechanism 7 further includes a forward clutch 7b which directly connects the sun gear and the carrier of the double pinion planetary gear set 7a and a reverse brake 7c which fixes a ring gear, transmits input rotation from the engine 5 to the primary pulley 2 via the torque converter 6 as it is when the forward clutch 7b is engaged, and transmits the input rotation from the engine 5 to the primary pulley 2 via the torque converter 6 while reversing and decelerating the input rotation when the reverse brake 7c is engaged.

The rotation of the primary pulley 2 is transmitted to the secondary pulley 3 via the V-belt 4, and the rotation of the secondary pulley 3 is then transmitted to unillustrated wheels via an output shaft 8, a gear set 9 and a differential gear device 10. To make a rotation transmission ratio (speed ratio) between the primary pulley 2 and the secondary pulley 3 changeable during the above power transmission, one of flanges forming the V-groove of each of the primary pulley 2 and the secondary pulley 3 is set as a fixed flange 2a, 3a and the other flange 2b, 3b is set as a movable flange displaceable in an axial direction. These movable flanges 2b, 3b are respectively biased toward the fixed flanges 2a, 3a by supplying a primary pulley pressure Ppri and a secondary pulley pressure Psec produced from a line pressure to be controlled as described in detail later as a source pressure to a primary pulley chamber 2c and a secondary pulley chamber 3c, whereby the V-belt 4 is frictionally engaged with the pulley flanges to enable the above power transmission between the primary pulley 2 and the secondary pulley 3. Note that, particularly in this embodiment, the pressure receiving areas of the primary pulley chamber 2c and the secondary pulley chamber 3c are made equal lest one of the pulleys 2, 3 should have a larger diameter than the other, whereby the V-belt continuously variable transmission is miniaturized.

Note that, during a speed change, a target speed ratio can be realized by changing the widths of the V-grooves of the both pulleys 2, 3 by a differential pressure between the primary pulley pressure Ppri and the secondary pulley pressure Psec produced to correspond to the target speed ratio as described later to continuously change looped arc diameters of the V-belt 4 on these pulleys 2, 3.

Outputs of the primary pulley pressure Ppri and the secondary pulley pressure Psec are controlled by a transmission control hydraulic circuit 11 together with outputs of engagement hydraulic pressures of the forward clutch 7b to be engaged when a forward drive range is selected and the reverse brake 7c to be engaged when a reverse drive range is selected. This transmission control hydraulic circuit 11 performs this control in response to a signal from the transmission controller 12.

To the transmission controller 12 are input a signal from a primary pulley rotation sensor 13 for detecting a primary pulley rotation speed Npri, a signal from a secondary pulley rotation sensor 14 for detecting a secondary pulley rotation speed Nsec, a signal from a secondary pulley pressure sensor 15 for detecting the secondary pulley pressure Psec, a signal from an accelerator pedal opening sensor 16 for detecting an accelerator pedal opening APO, a selected range signal from an inhibitor switch 17, a signal from an oil temperature sensor 18 for detecting a transmission hydraulic oil temperature TMP, a signal (indicating an engine rotation speed and a fuel injection time) relating to a transmission input torque from an engine controller 19 responsible for the control of the engine 5, and a signal from a vehicle speed sensor 50.

Figure 2:
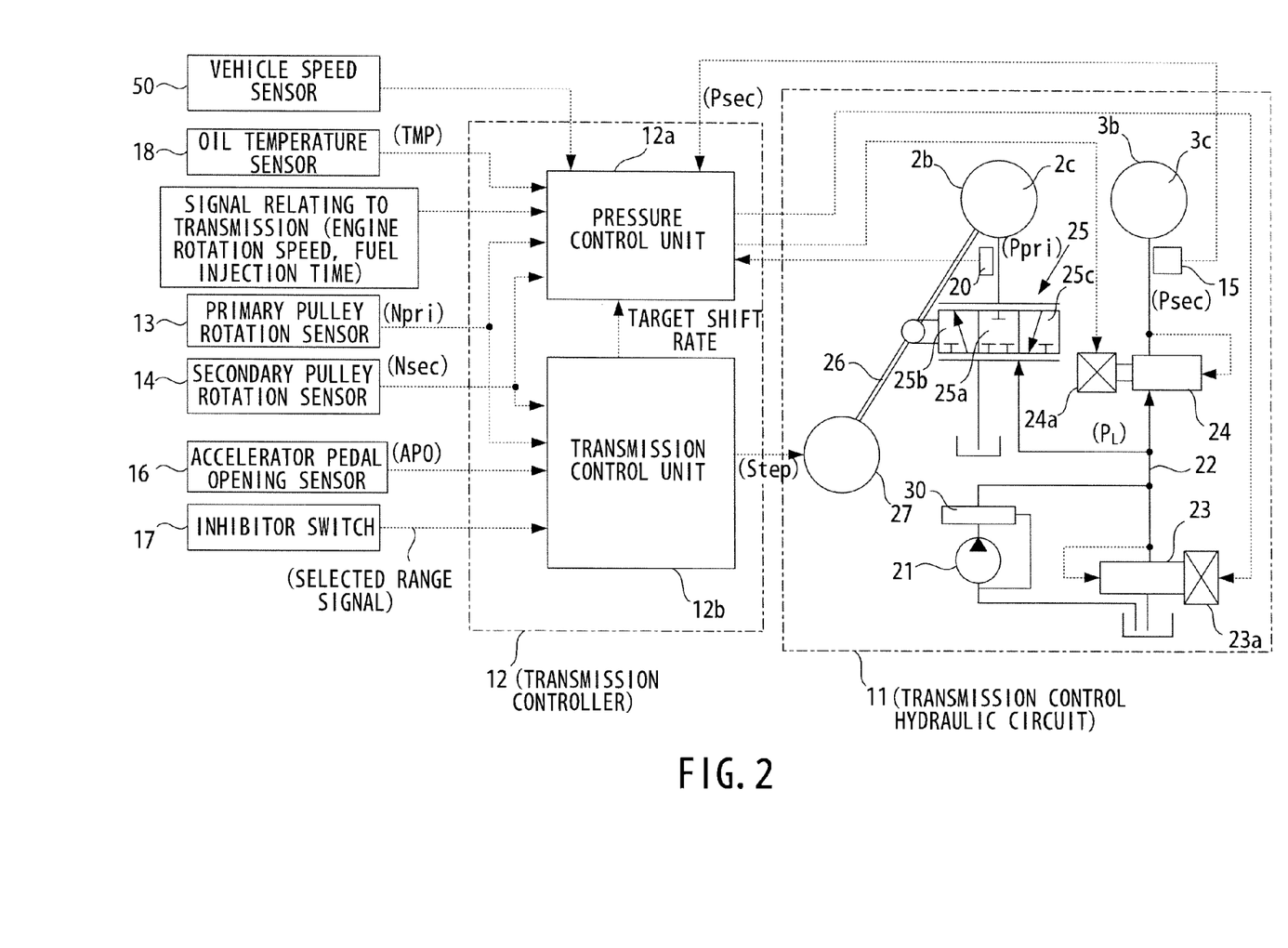
FIG. 2 is a diagram showing in more detail a transmission control hydraulic circuit and a transmission controller in the automatic transmission of FIG. 1.

FIG. 2 shows in more detail the transmission control hydraulic circuit 11 and the transmission controller 12 in the automatic transmission of FIG. 1. First, the transmission control hydraulic circuit 11 is described below. An engine-driven mechanical oil pump 21 is arranged in this circuit.

The mechanical oil pump 21 is provided at a position radially spaced from an output shaft of the torque converter 6, and a first sprocket is mounted on a shaft of the mechanical oil pump 21. The first sprocket is coupled to a second sprocket mounted on the output shaft of the torque converter 6 via a chain, whereby the rotation of the output shaft of the torque converter 6 is transmitted by the chain. In this way, a drive shaft of the mechanical oil pump 21 rotates and the mechanical oil pump 21 sucks hydraulic oil and discharges high-pressure hydraulic oil. The rotation speed of the drive shaft of the mechanical oil pump 21 changes according to the rotation speed of the output shaft of the torque converter 6, i.e. engine rotation speed. If the rotation speed of the output shaft of the torque converter 6 increases, the rotation speed of the drive shaft of the mechanical oil pump 21 also increases and the discharge amount of the mechanical oil pump 21 also increases.

By arranging the mechanical oil pump 21 at the position spaced from the output shaft of the torque converter 6 without providing the drive shaft of the mechanical oil pump 21 on the same axis as the output shaft of the torque converter 6, the diameter of the drive shaft of the mechanical oil pump 21 can be made smaller and the mechanical oil pump 21 can be miniaturized. Since friction is reduced if the mechanical oil pump 21 is miniaturized, efficiency is improved.

Figure 3:
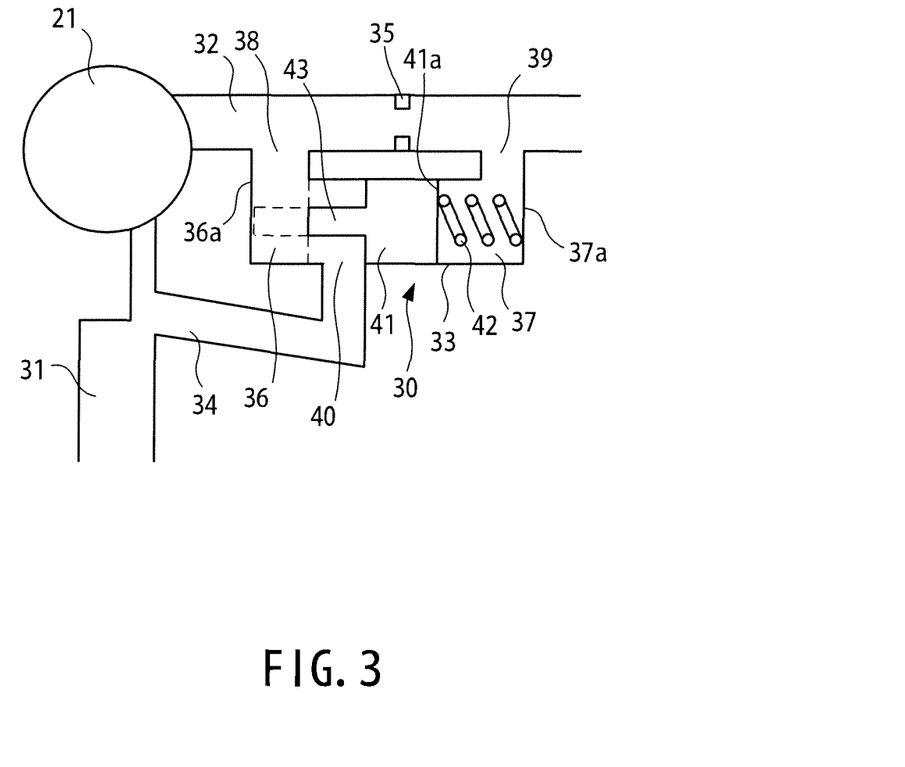
FIG. 3 is a schematic diagram showing a flow control mechanism of the first embodiment.

In the transmission control hydraulic circuit 11 of FIG. 2, a flow control mechanism 30 is further provided. FIG. 3 shows an example of the flow control mechanism 30.

The transmission control hydraulic circuit 11 includes a suction passage 31 in which hydraulic oil to be sucked into the mechanical oil pump 21 flows, a discharge passage 32 in which hydraulic oil discharged from the mechanical oil pump 21 flows, a pressure chamber 33 arranged in parallel with the discharge passage 32 and communicating with the discharge passage 32, and a communicating passage 34 communicating with the discharge passage 32 and the suction passage 31 via the pressure chamber 33 while bypassing the mechanical oil pump 21. The flow control mechanism 30 is provided in the pressure chamber 33.

An orifice 35 projecting into the discharge passage 32 from the inner wall of the discharge passage 32 is fat med in the discharge passage 32. The orifice 35 reduces the pressure of the hydraulic oil discharged from the mechanical oil pump 21. The discharge passage 32 communicates with an oil passage 22.

A first chamber 36 and a second chamber 37 are formed in the pressure chamber 33 by a spool 41 to be described later. The first chamber 36 communicates with a part of the discharge passage 32 located upstream of the orifice 35 in a flowing direction of the hydraulic oil through a first communication port 38 and a hydraulic pressure upstream of the orifice 35 is introduced thereinto. Further, the second chamber 37 communicates with a part of the discharge passage 32 located downstream of the orifice 35 in the flowing direction of the hydraulic oil through a second communication port 39 and a hydraulic pressure downstream of the orifice 35 is introduced thereinto. Further, an opening 40 of the communicating passage 34 is formed in a side surface of the first chamber 36.

The flow control mechanism 30 includes the spool 41 which slides along the inner wall of the pressure chamber 33 and a spring 42 which biases the spool 41 to reduce the volume of the first chamber 36. The spool 41 includes a stopper 43 projecting into the first chamber 36. One end of the spring 42 is mounted on an end surface 41a of the spool 41 defining the second chamber 37. The other end of the spring 42 is mounted on a side surface 37a of the second chamber 37 facing the end surface 41a of the spool 41. The stopper 43 comes into contact with a side surface 36a of the first chamber 36 to restrict a movement of the spool 41 when the spool 41 is moved by a biasing force of the spring 42.

The spool 41 slides along the inner wall of the pressure chamber 33 due to a differential pressure between the first and second chambers 36, 37 and the biasing force of the spring 42. If the differential pressure between the first and second chambers 36, 37 is relatively small, the spool 41 is moved to the left side of FIG. 3, i.e. to the upstream side by the biasing force of the spring 42. In this case, the spool 41 closes the opening 40 of the communicating passage 34. If the differential pressure between the first and second chambers 36, 37 becomes large, the spool 41 is moved to the right side of FIG. 3, i.e. to the downstream side against the biasing force of the spring 42. In this way, the opening 40 of the communicating passage 34 communicates with the first chamber 36.

The communicating passage 34 allows the suction passage 31 and the part of the discharge passage 32 upstream of the orifice 35 to communicate via the opening 40 and the first chamber 36 when the opening 40 is not closed by the spool 41. Note that the communicating passage 34 preferably communicates at a position close to a suction port of the mechanical oil pump 21. In this way, even if air is mixed into the hydraulic oil, the hydraulic pressure of the hydraulic oil in the mechanical oil pump 21 is increased and air is compressed, whereby the pulsation of the discharge amount can be suppressed. Further, by returning the hydraulic oil returned by the communicating passage 34 to the vicinity of the suction port of the mechanical oil pump 21, the hydraulic oil in the communicating passage 34 can be sucked into the mechanical oil pump 21 without necessitating a large suction force by the mechanical oil pump 21. That is, the discharge amount can be increased without increasing the volume of the mechanical oil pump 21.

The hydraulic oil discharged from the mechanical oil pump 21 and supplied to the oil passage 22 via the discharge passage 32 is adjusted to a predetermined line pressure by a pressure regulator valve 23. The line pressure in the oil passage 22 is, on one hand, adjusted by a pressure reducing valve 24 and supplied as the secondary pulley pressure Psec to the secondary pulley chamber 3c and, on the other hand, adjusted by a transmission control valve 25 and supplied as the primary pulley pressure Ppri to the primary pulley chamber 2c. Note that the pressure regulator valve 23 controls the line pressure by a current to a solenoid 23a and the pressure reducing valve 24 controls the secondary pulley pressure Psec by a current to a solenoid 24a. Further, a part of the line pressure is supplied to the torque converter 6 and the like via a pressure regulating valve. Even if the discharge amount of the mechanical oil pump 21 is constant, the line pressure can be increased by throttling the hydraulic pressure supplied to the torque converter 6 and the like.

The transmission control valve 25 has a neutral position 25a, a pressure increasing position 25b and a pressure reducing position 25c. To switch these valve positions, the transmission control valve 25 is coupled to a middle part of a shift link 26, a stepping motor 27 as a shift actuator is coupled to one end of the shift link 26 and the movable flange 2b of the primary pulley is coupled to the other end thereof. The stepping motor 27 is set at an operation position advanced by a step number Step corresponding to a target speed ratio from a reference position, and the shift link 26 is pivoted about its part coupled to the movable flange 2b by the operation of the stepping motor 27, whereby the transmission control valve 25 is set to the pressure increasing position 25b or the pressure reducing position 25c from the neutral position 25a. In this way, the primary pulley pressure Ppri is increased using the line pressure as a source pressure or reduced by being drained and upshifting to a higher speed ratio or downshifting to a lower speed ratio occurs due to a change in the differential pressure between the primary pulley pressure Ppri and the secondary pulley pressure Psec, whereby a speed ratio changing operation toward the target speed ratio is performed.

The progress of this shift is fed back to the corresponding end of the shift link 26 via the movable flange 2b of the primary pulley and the shift link 26 is pivoted in a direction to return the transmission control valve 25 from the pressure increasing position 25b or the pressure reducing position 25c to the neutral position 25a about its part coupled to the stepping motor 27. In this way, when the target speed ratio is achieved, the transmission control valve 25 is returned to the neutral position 25a and the target speed ratio can be kept.

A solenoid current of the pressure regulator valve 23, a solenoid current of the pressure reducing valve 24 and a shift command (step number Step) to the stepping motor 27 are determined by the transmission controller 12 together with a control as to whether or not to supply an engagement hydraulic pressure to the forward clutch 7b and the reverse brake 7c shown in FIG. 1, and the transmission controller 12 is configured by a pressure control unit 12a and a transmission control unit 12b as shown in FIG. 2. The pressure control unit 12a determines the solenoid current of the pressure regulator valve 23 and that of the pressure reducing valve 24 and the transmission control unit 12b determines a drive step number A step of the stepping motor 27 in the following manner.

That is, the transmission control unit 12b first obtains a target input rotation speed based on a planned shift map using the vehicle speed which can be calculated from the secondary pulley rotation speed Nsec and the accelerator pedal opening APO, and calculates a target speed ratio corresponding to a driving condition (vehicle speed and accelerator pedal opening APO) by dividing the obtained target input rotation speed by the secondary pulley rotation number Nsec. Subsequently, by dividing the primary pulley rotation speed Npri by the secondary pulley rotation speed Nsec, an actual speed ratio is calculated and a speed ratio command for causing the actual speed ratio to approach the target speed ratio at a target shift rate is obtained while compensating for a disturbance according to a deviation of the actual speed ratio from the target speed ratio. Then, the step number A step of the stepping motor 27 (operation position of the stepping motor 27) to realize this speed ratio command is calculated, and the target speed ratio can be achieved by the above speed ratio changing operation by giving the calculated step number A step as a command to the stepping motor 27.

The transmission controller 12 includes a CPU, a ROM, a RAM and the like and performs a hydraulic control and the like by reading a program stored in the ROM by the CPU.

Next, the operation of the flow control mechanism 30 is specifically described.

If the rotation speed of the drive shaft of the mechanical oil pump 21 is low and the discharge amount of the mechanical oil pump 21 is small, a pressure loss by the orifice 35 is small. Thus, the differential pressure between the upstream side of the orifice 35 and the downstream side of the orifice 35 is low and the differential pressure between the first chamber 36 and the second chamber 37 is also low. Thus, the spool 41 is moved by the biasing force by the spring 42 to reduce the volume of the first chamber 36 and the stopper 43 is in contact with the end surface of the first chamber 36. In this case, the spool 41 closes the opening 40 of the communicating passage 34 and the first chamber 36 and the communicating passage 34 do not communicate.

When the rotation speed of the drive shaft of the mechanical oil pump 21 increases, the discharge amount of the mechanical oil pump 21 increases and, accordingly, the differential pressure between the upstream side of the orifice 35 and the downstream side of the orifice 35 increases and the differential pressure between the first chamber 36 and the second chamber 37 also increases. Then, the spool 41 is moved against the biasing force of the spring 42 to increase the volume of the first chamber 36. If the differential pressure between the first chamber 36 and the second chamber 37 becomes larger than a predetermined value, the opening 40 of the communicating passage 34 is opened and the first chamber 36 and the communicating passage 34 communicate. The predetermined value is a value set in advance, based on which whether or not to open the opening 40 of the communicating passage 34 is determined. If the differential pressure between the first chamber 36 and the second chamber 37 is equal to or smaller than the predetermined value, the opening 40 of the communicating passage 34 is closed by the spool 41. By the communication between the first chamber 36 and the communicating passage 34, a part of the hydraulic oil discharged from the mechanical oil pump 21 and increased in pressure is returned to the suction passage 31 of the mechanical oil pump 21. Thus, the discharge amount can be increased using the small-size mechanical oil pump 21. Further, since the suction amount of hydraulic oil mixed with air having a low compression ratio decreases, the discharge amount of the mechanical oil pump 21 can be increased.

However, in such a mechanical oil pump 21, the flow rate of the hydraulic oil discharged from the mechanical oil pump 21 decreases and the pulsation of the discharge amount becomes larger if the amount of air mixed into the hydraulic oil sucked from the oil pan increases. Further, the phase of the pulsation of the hydraulic pressure in the first chamber 36 and that of the pulsation of the hydraulic pressure in the second chamber 37 are shifted due to the influence of the orifice 35, the first communication port 38 and the second communication port 39. Thus, if the pulsation of the discharge amount becomes larger, the pulsation of the differential pressure between the hydraulic pressure in the first chamber 36 and that in the second chamber 37 becomes even larger.

As a result, even if the differential pressure is supposed to become larger than the predetermined value and the spool 41 has to be moved to allow communication between the first chamber 36 and the communication path 34, the differential pressure may become smaller than the predetermined value and the spool 41 may close the opening 40 since a change amount of the differential pressure is large.

When the spool 41 closes the opening 40, the hydraulic oil having a high hydraulic pressure and discharged from the mechanical oil pump 21 cannot be returned to the mechanical oil pump 21 via the communicating passage 34. Further, since the hydraulic oil in which the mixed air is compressed is not introduced to the mechanical oil pump 21, the hydraulic pressure of the hydraulic oil in the mechanical oil pump 21 decreases and the air mixed in the hydraulic oil expands. These result in a further reduction in the discharge amount of the mechanical oil pump 21. This makes the differential pressure between the first chamber 36 and the second chamber 37 even smaller than the predetermined value and the spool 41 completely closes the opening 40. In this way, the discharge amount of the mechanical oil pump 21 decreases and a necessary hydraulic pressure cannot be supplied if air is mixed into the hydraulic oil.

Further, if the amount of air mixed into the hydraulic oil increases when the discharge amount of the mechanical oil pump 21 is large and the opening 40 of the communicating passage 34 is open, the flow rate of the hydraulic oil discharged from the mechanical oil pump 21 decreases and the pulsation of the discharge amount becomes larger. Thus, the pulsation of the differential pressure between the first chamber 36 and the second chamber 37 becomes larger, and the spool 41 is moved by the biasing force of the spring 42 to close the opening 40 of the communicating passage 3 when the differential pressure between the first chamber 36 and the second chamber 37 is small. Also in this case, the discharge amount of the mechanical oil pump 21 decreases and a necessary hydraulic pressure cannot be supplied.

Such a phenomenon occurs, for example, when the mixed amount of air increases due to an increase in the engine rotation speed or the rotation speed of a differential gear (hereinafter, referred to as a differential rotation speed) or when oil temperature increases to reduce the defoaming action of a defoaming agent. This is for the following reasons. When the engine rotation speed increases, the rotation speed of the rotating member such as the primary pulley 2 immersed in the hydraulic oil also increases so that the hydraulic oil is agitated to include more air. Further, when oil temperature increases and the defoaming action of the defoaming agent decreases, the remaining amount of air mixed into the hydraulic oil increases. This phenomenon also occurs, for example, when an engine torque decreases and the line pressure is low. When the line pressure decreases, the hydraulic pressure in the discharge passage 32 also decreases, the compressed amount of air mixed into the hydraulic oil in the discharge passage 32 decreases and the percentage of air per unit volume increases.

In this embodiment, by increasing the line pressure when the above phenomenon may occur, the air mixed into the hydraulic oil is compressed to suppress the pulsation of the discharge amount of the mechanical oil pump 21 and a reduction in the discharge amount of the mechanical oil pump 21.

Figure 4:
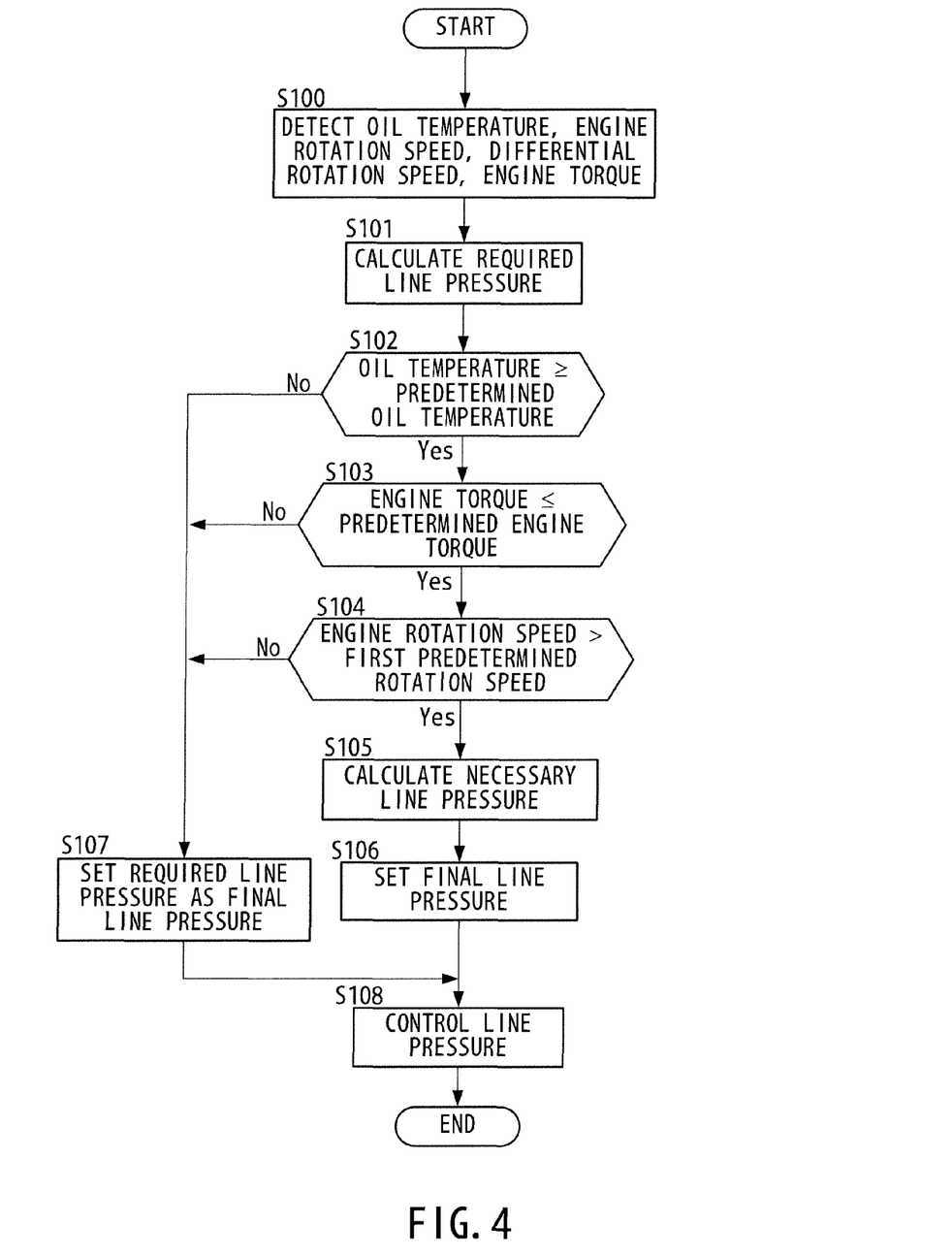
FIG. 4 is a flow chart showing a hydraulic control of the first embodiment.

Next, a hydraulic control performed by the transmission controller 12 in this embodiment is described using a flow chart shown in FIG. 4.

In Step S100, the oil temperature is detected by the oil temperature sensor 18 and the engine rotation speed is read from a signal relating to the transmission input torque. Further, an engine torque is calculated based on a signal from the accelerator opening sensor 16. Furthermore, the differential rotation speed is calculated based on a signal of the vehicle speed sensor 50.

In Step S101, a required line pressure is calculated. The required line pressure is a line pressure necessary to supply the hydraulic pressure to the primary pulley 2 and the secondary pulley 3 or a line pressure necessary to satisfy a torque capacity of the torque converter 6. The higher the engine torque, the higher the line pressure necessary to suppress, for example, the slip of the V-belt 4. Thus, the higher the engine torque, the higher the required line pressure.

In Step S102, whether or not the detected oil temperature is equal to or higher than a predetermined oil temperature is determined. If the detected oil temperature is equal to or higher than the predetermined oil temperature, Step S103 follows. If the detected oil temperature is lower than the predetermined oil temperature, Step S107 follows. The predetermined oil temperature is an oil temperature at which the spool 41 completely closes the opening 40 of the communicating passage 34 and the opening 40 cannot be opened when the amount of air mixed into the hydraulic oil increases as the oil temperature increases. That is, if the oil temperature is lower than the predetermined oil temperature, the pulsation of the hydraulic pressure discharged from the mechanical oil pump does not increase and the spool 41 does not close the opening 40 of the communicating passage 34 due to the pulsation of the hydraulic pressure.

In Step S103, whether or not the calculated engine torque is equal to or lower than a predetermined engine torque is determined. If the calculated engine torque is equal to or lower than the predetermined engine torque, Step S104 follows. If the calculated engine torque is higher than the predetermined engine torque, Step S107 follows. If the engine torque increases, the line pressure increases to suppress the slip of the V-belt 4. Thus, the hydraulic pressure in the discharge passage 32 is high and the air mixed into the hydraulic oil is sufficiently compressed when the engine torque is high, wherefore the pulsation of the discharge amount can be suppressed. In other words, when the engine torque is low, the hydraulic pressure in the discharge passage 32 decreases, the air mixed into the hydraulic oil expands and the pulsation of the discharge amount becomes larger. The predetermined engine torque is a torque at which the pulsation cannot be suppressed when the air mixed into the hydraulic oil expands as the engine torque decreases. That is, when the engine torque is higher than the predetermined engine torque, the pulsation of the hydraulic pressure discharged from the mechanical oil pump 21 does not increase and the spool 41 does not close the opening 40 of the communicating passage 34 due to the pulsation of the hydraulic pressure.

Note that although the determinations are made based on the engine torque here, they may be made based on the input torque to the V-belt continuously variable transmission 1 or the input torque of the primary pulley.

When the engine torque is higher than the predetermined engine torque even if the oil temperature is equal to or higher than the predetermined oil temperature, the line pressure is set according to the engine torque and the pulsation of the hydraulic pressure discharged from the mechanical oil pump 21 is suppressed, wherefore the spool 41 does not close the opening 40 of the communicating passage 34 due to the pulsation. Further, when the oil temperature is lower than the predetermined oil temperature even if the engine torque is equal to or lower than the predetermined engine torque, the amount of air mixed into the hydraulic oil is small. Thus, the pulsation of the discharge amount of the mechanical oil pump 21 is small and the spool 41 does not close the opening 40 of the communicating passage 34 due to the pulsation. Therefore, Step S104 follows only when the oil temperature is equal to or higher than the predetermined oil temperature and the engine torque is equal to or lower than the predetermined engine torque.

In Step S104, whether or not the engine rotation speed is higher than a first predetermined rotation speed is determined. If the engine rotation speed is higher than the first predetermined rotation speed, Step S105 follows. If the engine rotation speed is equal to or lower than the first predetermined rotation speed, Step S107 follows. The first predetermined rotation speed is a speed at which a reduced amount of the discharge amount caused by the closure of the opening 40 is a permissible value even if the spool 41 closes the opening 41 due to the pulsation of the discharge amount. That is, if the engine rotation speed is equal to or lower than the first predetermined rotation speed, the reduced amount of the discharge amount is equal to or below the permissible value. If the reduced amount of the discharge amount is equal to or below the permissible value, the hydraulic pressure supplied to the V-belt continuously variable transmission 1, the torque converter 6 and the like does not become insufficient. The first predetermined rotation speed is a value set according to the discharge performance of the mechanical oil pump 21.

Figure 5:
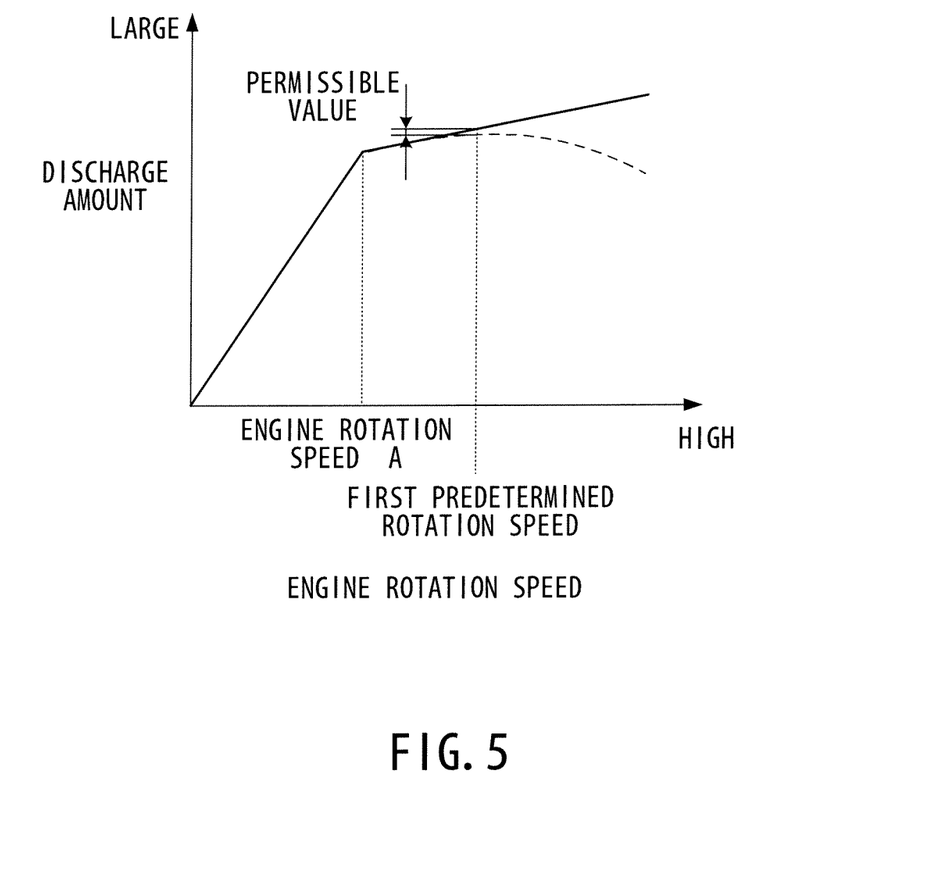
FIG. 5 is a map for calculating a necessary line pressure in the first embodiment.

As shown in FIG. 5, if the spool 41 closes the opening 40 due to the pulsation of the discharge amount of the mechanical oil pump 21 after the engine rotation speed increases and the spool 41 opens the opening 40 at a certain engine rotation speed A, the discharge amount decreases. The discharge amount of the mechanical oil pump 21 when the spool 41 closes the opening 40 due to the pulsation of the discharge amount after the opening 40 is opened is shown by broken line in FIG. 5.

If the spool 41 closes the opening 40 due to the pulsation of the discharge amount when the engine rotation speed is higher than the first predetermined rotation speed, the reduced amount of the discharge amount of the mechanical oil pump 21 becomes larger than the permissible value. Thus, the hydraulic pressure required by the V-belt continuously variable transmission 1, the torque converter 6 and the like cannot be supplied.

On the other hand, even if the spool 41 closes the opening 40 due to the pulsation of the discharge amount when the engine rotation speed is equal to or lower than the first predetermined rotation speed, the reduced amount of the discharge amount of the mechanical oil pump 21 is equal to or below the permissible value. Thus, the hydraulic pressure required by the V-belt continuously variable transmission 1, the torque converter 6 and the like can be supplied.

Step S107 follows if the engine rotation speed is equal to or lower than the first predetermined rotation speed in Step S104, and Step S105 follows if the engine rotation speed is higher than the first predetermined rotation speed.

Figure 6:
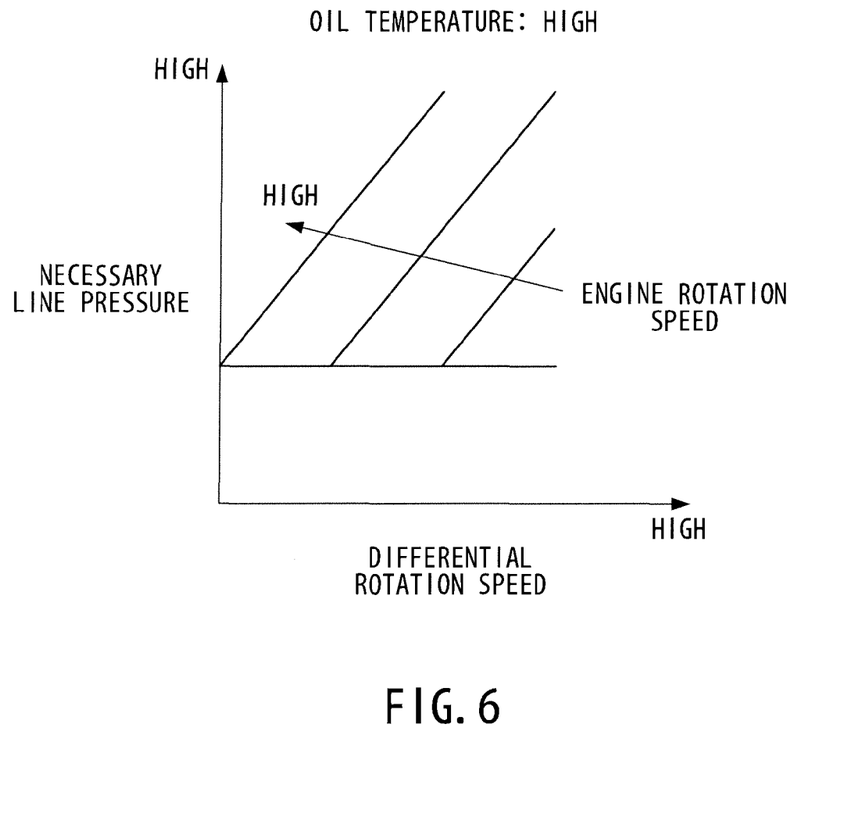
FIG. 6 is a map showing a relationship of a engine rotation speed, an oil temperature, a differential rotation speed and a necessary line pressure.
Figure 7:
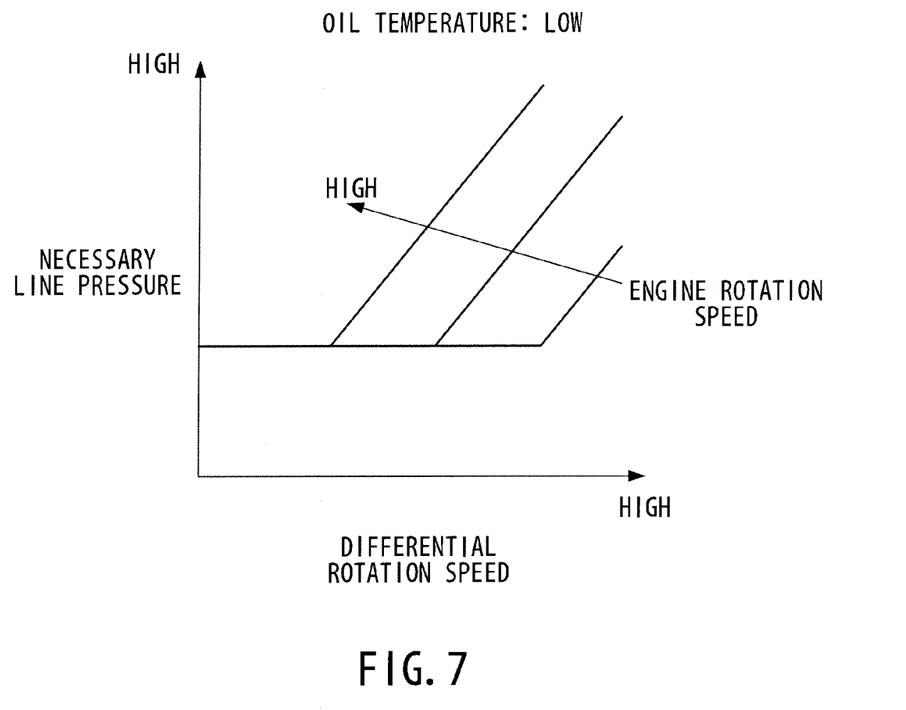
FIG. 7 is a map showing a relationship of a engine rotation speed, an oil temperature, a differential rotation speed and a necessary line pressure.

In Step S105, a necessary line pressure is calculated from maps shown in FIGS. 6 and 7 based on the detected oil temperature, the read engine rotation speed and the calculated differential rotation speed. FIGS. 6 and 7 are the maps showing a relationship of the engine rotation speed, the oil temperature, the differential rotation speed and the necessary line pressure. FIG. 6 is the map when the oil temperature is relatively high and FIG. 7 is the map when the oil temperature is lower than that of FIG. 6. In FIGS. 6 and 7, lines corresponding to three engine rotation speeds are drawn as examples, and the left, middle and right engine rotation speeds of each of FIGS. 6 and 7 are respectively equal speeds. The necessary line pressure increases as the engine rotation speed increases, as the differential rotation speed increases and as the oil temperature increases. The maps shown in FIGS. 6 and 7 are examples and a plurality of such maps are prepared according to the oil temperature.

A lower limit value of the necessary line pressure is set in FIGS. 6 and 7. The lower limit value is a line pressure at which the V-belt 4 does not slip and a necessary hydraulic pressure can be produced by the forward clutch 7a and the like of the forward/reverse switching mechanism 7.

In Step S106, the required line pressure calculated in Step S101 and the necessary line pressure calculated in Step S105 are compared and the larger value is set as a final line pressure. The line pressure is used, for example, to produce a necessary torque capacity in the torque converter 6 besides being used as the hydraulic pressure to be supplied to the primary pulley 2 and the secondary pulley 3. Thus, the higher line pressure necessary to produce the hydraulic pressure required in the V-belt continuously variable transmission 1, the torque converter 6 and the like is set as the final line pressure.

The spool 41 does not close the opening 40 of the communicating passage 34 due to the pulsation or the reduced amount of the discharge amount of the mechanical oil pump 21 is small even if the spool 41 closes the opening 40 when the oil temperature is lower than the predetermined oil temperature, when the engine torque is higher than the predetermined engine torque or when the engine rotation speed is equal to or lower than the first predetermined rotation speed. Thus, the line pressure calculated in Step S101 is set as the final line pressure in Step S107.

In Step S108, the line pressure is controlled based on the set final line pressure. If the necessary line pressure is set as the final line pressure, the line pressure is increased, for example, by throttling the hydraulic pressure supplied to the torque converter 6 and the like, for example, by the pressure regulator valve 23 or the like. This can increase the hydraulic pressure in the discharge passage 32 of the mechanical oil pump 21 and suppress the pulsation of the discharge amount.

Note that the mechanical oil pump 21 may be configured as one unit including the above flow control mechanism 30 and the like.

Effects of the first embodiment of the present invention are described.

The necessary line pressure is increased as the differential rotation speed increases when the engine torque is equal to or lower than the predetermined engine torque and the oil temperature is equal to or higher than the predetermined oil temperature. This increases the hydraulic pressure of the hydraulic oil in the discharge passage 32, compresses the air included in the hydraulic oil and suppresses the pulsation of the discharge amount of the mechanical oil pump 21 when the differential rotation speed increases and the amount of air included in the hydraulic oil increases. As a result, when the differential pressure between the first chamber 36 and the second chamber 37 exceeds a predetermined value, the spool 41 normally operates and the opening 40 of the communicating passage 34 is opened. Since a part of the hydraulic oil is returned to the mechanical oil pump 21, it is possible to suppress a reduction in the discharge amount of the mechanical oil pump 21 and supply a necessary hydraulic pressure, for example, to the V-belt continuously variable transmission 1.

Further, by causing the spool 41 to normally operate to return a part of the hydraulic oil discharged by the mechanical oil pump 21 to the mechanical oil pump 21, the hydraulic pressure of the hydraulic oil in the mechanical oil pump 21 can be increased and the air mixed into the hydraulic oil in the mechanical oil pump 21 can be compressed. Thus, the pulsation of the discharge amount of the mechanical oil pump 21 can be suppressed.

Even if the amount of air included in the hydraulic oil increases, the spool 41 can be caused to normally operate to return the hydraulic oil having a high hydraulic pressure to the mechanical oil pump 21 by the flow control mechanism 30, and a desired discharge amount can be supplied using the small-size mechanical oil pump 21. By using the small-size mechanical oil pump 21, the efficiency of the mechanical oil pump 21 can be improved. Further, since the suction amount of hydraulic oil mixed with air having a low compression ratio decreases, the discharge amount of the mechanical oil pump 21 can be increased.

The necessary line pressure is increased as the engine rotation speed increases. This increases the hydraulic pressure of the hydraulic oil in the discharge passage 32 when the engine rotation speed increases and the amount of air included in the hydraulic oil increases. As a result, it is possible to suppress the pulsation of the discharge amount of the mechanical oil pump 1, suppress a reduction in the discharge amount of the mechanical oil pump 21 and supply a necessary hydraulic pressure, for example, to the V-belt continuously variable transmission 1.

Since the necessary line pressure is calculated and the line pressure is increased only when the engine rotation speed is higher than the first predetermined rotation speed and the reduced amount of the discharge amount of the mechanical oil pump 21 becomes larger than the permissible value by the closure of the opening 41 by the spool 41 due to the pulsation of the discharge amount, it is possible to prevent the line pressure from being unnecessarily increased and avoid the deterioration of fuel economy. Therefore, the fuel economy of the vehicle can be finally improved by the miniaturization of the mechanical oil pump 21.

By increasing an increasing amount of the necessary line pressure as the oil temperature increases, the pulsation of the discharge amount of the mechanical oil pump 21 can be suppressed also when the amount of air mixed into the hydraulic oil increases as the oil temperature increases.

Next, a second embodiment of the present invention is described.

The second embodiment differs from the first embodiment in the hydraulic control. Points different from the first embodiment are described here.

Figure 8:
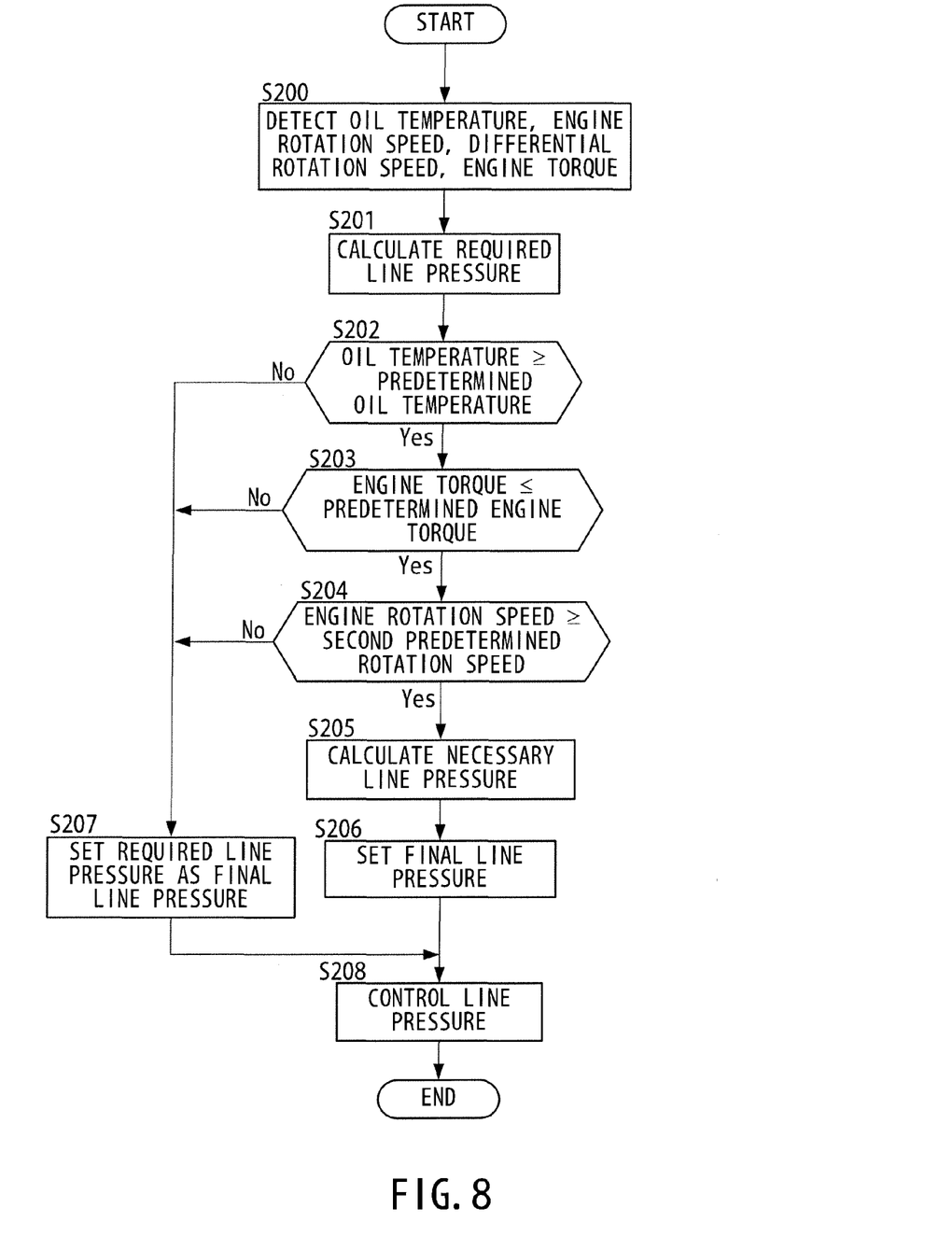
FIG. 8 is a flow chart showing a hydraulic pressure control of a second embodiment.

A hydraulic control in this embodiment is described using FIG. 8.

Steps S200 to S203 are not described here since relating to the same control in Steps S100 to S103 of the first embodiment.

In Step S204, whether or not the engine rotation speed is equal to or higher than a second predetermined rotation speed is determined. If the engine rotation speed is equal to or higher than the second predetermined rotation speed, Step 205 follows. If the engine rotation speed is lower than the second predetermined rotation speed, Step S207 follows. The second predetermined rotation speed is an engine rotation speed at which the differential pressure between the first chamber 36 and the second chamber 37 is equal to or above a predetermined value, and is lower than the first predetermined rotation speed in the first embodiment. The engine rotation speed A in the first embodiment corresponds to the second predetermined rotation speed. The rotation of the engine is transmitted to the mechanical oil pump 21 via the first and second sprockets. Thus, if the engine rotation speed increases, the rotation speed of the drive shaft of the mechanical oil pump 21 also increases and the discharge amount of the mechanical oil pump 21 increases. If the engine rotation speed increases to or above the second predetermined rotation speed, the differential pressure between the first chamber 36 and the second chamber 37 increases to or above the predetermined value and the opening 40 of the communicating passage 34 is opened. On the other hand, if the engine rotation speed is lower than the second predetermined rotation speed, the opening 40 of the communicating passage 34 is closed by the spool 41.

Note that although the determination is made based on the engine rotation speed here, it is not limited to this and may be made based on the rotation speed of the output shaft of the torque converter 6 or the like.

Steps S205 to S208 are not described here since relating to the same control in Steps S105 to S108 of the first embodiment.

Effects of the second embodiment of the present invention are described.

The differential pressure between the first chamber 36 and the second chamber 37 does not become larger than the predetermined value and the opening 40 of the communicating passage 34 is closed by the spool 41 when the engine rotation speed is lower than the second predetermined rotation speed. In such a case, the necessary line pressure is not calculated. This can prevent the line pressure from being unnecessarily increased and improve fuel economy.

Although the differential rotation speed is detected by the vehicle speed sensor and the line pressure is calculated based on the differential rotation speed in the above embodiments, the necessary line pressure may be calculated based on the rotation speed of a parking gear, for example, in the case of an FR automatic transmission in which an engine is longitudinally mounted. The parking gear is immersed in hydraulic oil in the automatic transmission or immersed in hydraulic oil when a vehicle is inclined, for example, during the acceleration or turning motion of the vehicle. Thus, the amount of air included in the hydraulic oil increases as the rotation speed of the parking gear increases. Accordingly, by calculating the necessary line pressure based on the rotation speed of the parking gear, a reduction in the discharge amount of the mechanical oil pump can be suppressed.

Although the differential rotation speed is calculated based on the signal output from the vehicle speed sensor 50, it may be calculated based on the signal output from the secondary pulley rotation sensor 14 or the like.

The present invention is not limited to the embodiments described above and obviously includes various modifications and improvements which can be made within the scope of the technical concept thereof.

This application claims priority from Japanese Patent Application No. 2011-135920, filed Jun. 20, 2011, which is incorporated herein by reference in its entirety.

What is claimed is:

1. A control device for controlling an automatic transmission including:
   a mechanical oil pump which is drivable by having rotation of an engine transmitted thereto;
   a suction passage in which hydraulic oil sucked into the mechanical oil pump is configured to flow;
   a discharge passage in which the hydraulic oil discharged from the mechanical oil pump is configured to flow, wherein the discharge passage includes a narrow part;
   a communicating passage which allows communication between the suction passage and a part of the discharge passage upstream of the narrow part in a flowing direction of the hydraulic oil while bypassing the mechanical oil pump; and
   a flow control mechanism which includes a spool configured to set the communicating passage in a communicating state when a differential pressure between a hydraulic pressure upstream of the narrow part and that downstream of the narrow part in the flowing direction of the hydraulic oil is larger than a predetermined value and configured to set the communicating passage in a non-communicating state when the differential pressure is equal to or smaller than the predetermined value;
   wherein the control device, comprises:
   an oil temperature detection unit configured to detect oil temperature of the hydraulic oil;
   an engine torque calculation unit configured to calculate an engine torque;
   a line pressure setting unit configured to set a higher line pressure as the engine torque increases;
   a first rotation speed detection unit configured to detect a rotation speed of an output shaft side of the automatic transmission; and
   a line pressure correction unit configured to increase line pressure as the rotation speed of the output shaft side increases when the oil temperature is equal to or higher than a predetermined oil temperature at which the communicating passage is switched from the communicating state to the non-communicating state due to air mixed into the hydraulic oil and the engine torque is equal to or lower than a predetermined engine torque at which the communicating passage is switched from the communicating state to the non-communicating state due to the air mixed into the hydraulic oil.

2. The control device according to claim 1, further comprising a second rotation speed detection unit configured to detect a rotation speed of an input shaft side of the automatic transmission, wherein the line pressure correction unit is configured to increase the line pressure as the rotation speed of the input shaft side increases.

3. The control device according to claim 2, wherein the line pressure correction unit is configured to increase the line pressure when the rotation speed of the input shaft side of the automatic transmission is higher than a first predetermined rotation speed; and wherein the first predetermined rotation speed is a rotation speed at which a reduced amount of a discharge amount of the mechanical oil pump caused by the switch of the communicating passage from the communicating state to the non-communicating state due to the air mixed into the hydraulic oil is a permissible value at which a hydraulic pressure shortage does not occur.

4. The control device according to claim 2, wherein the line pressure correction unit is configured to increase the line pressure when the rotation speed of the input shaft side of the automatic transmission is equal to or higher than a second predetermined rotation speed at which the differential pressure becomes larger than the predetermined value.

5. The control device according to claim 1, wherein the line pressure correction unit is configured to increase the line pressure as the oil temperature increases.

6. The control device according to claim 1, wherein the first rotation speed detection unit is configured to detect a rotation speed of a differential gear.

7. The control device according to claim 1, wherein the first rotation speed detection unit is configured to detect a rotation speed of a parking gear.

8. A control method for controlling an automatic transmission including:
a mechanical oil pump which is drivable by having rotation of an engine transmitted thereto;
a suction passage in which hydraulic oil sucked into the mechanical oil pump is configured to flow;
a discharge passage in which the hydraulic oil discharged from the mechanical oil pump is configured to flow, wherein the discharge passage includes a narrow part;
a communicating passage which allows communication between the suction passage and a part of the discharge passage upstream of the narrow part in a flowing direction of the hydraulic oil while bypassing the mechanical oil pump; and
a flow control mechanism which includes a spool configured to set the communicating passage in a communicating state when a differential pressure between a hydraulic pressure upstream of the narrow part and that downstream of the narrow part in the flowing direction of the hydraulic oil is larger than a predetermined value and configured to set the communicating passage in a non-communicating state when the differential pressure is equal to or smaller than the predetermined value;
wherein the control method, comprises:
detecting by an oil temperature sensor, oil temperature of the hydraulic oil;
calculating by a controller, an engine torque;
setting by the controller, a higher line pressure as the engine torque increases;
detecting by a rotation speed sensor, rotation speed of an output shaft side of the automatic transmission; and
increasing by the controller, line pressure as the rotation speed of the output shaft side increases when the oil temperature is equal to or higher than a predetermined oil temperature at which the communicating passage is switched from the communicating state to the non-communicating state due to air mixed into the hydraulic oil and the engine torque is equal to or lower than a predetermined engine torque at which the communicating passage is switched from the communicating state to the non-communicating state due to the air mixed into the hydraulic oil.

9. A control device for controlling an automatic transmission including:
a mechanical oil pump which is driven by having rotation of an engine transmitted thereto;
a suction passage in which hydraulic oil sucked into the mechanical oil pump is configured to flow;
a discharge passage in which the hydraulic oil discharged from the mechanical oil pump is configured to flow, wherein the discharge passage includes a narrow part;
a communicating passage which allows communication between the suction passage and a part of the discharge passage upstream of the narrow part in a flowing direction of the hydraulic oil while bypassing the mechanical oil pump; and
a flow control mechanism which includes a spool configured to set the communicating passage in a communicating state when a differential pressure between a hydraulic pressure upstream of the narrow part and that downstream of the narrow part in the flowing direction of the hydraulic oil is larger than a predetermined value and setting the communicating passage in a non-communicating state when the differential pressure is equal to or smaller than the predetermined value;
wherein the control device, comprises:
oil temperature detection means for detecting oil temperature of the hydraulic oil;
engine torque calculation means for calculating an engine torque;
line pressure setting means for setting a higher line pressure as the engine torque increases;
first rotation speed detection means for detecting rotation speed of an output shaft side of the automatic transmission; and
line pressure correction means for increasing the line pressure as the rotation speed of the output shaft side increases when the oil temperature is equal to or higher than a predetermined oil temperature at which the communicating passage is switched from the communicating state to the non-communicating state due to air mixed into the hydraulic oil and the engine torque is equal to or lower than a predetermined engine torque at which the communicating passage is switched from the communicating state to the non-communicating state due to the air mixed into the hydraulic oil.

* * * * *